J. D. BENBOW.
DUST GUARD FOR CAR AXLES.
APPLICATION FILED OCT. 29, 1920.
1,389,289.
Patented Aug. 30, 1921.
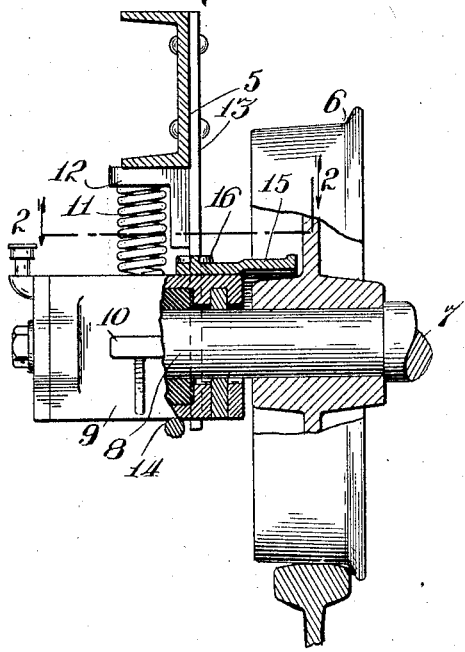
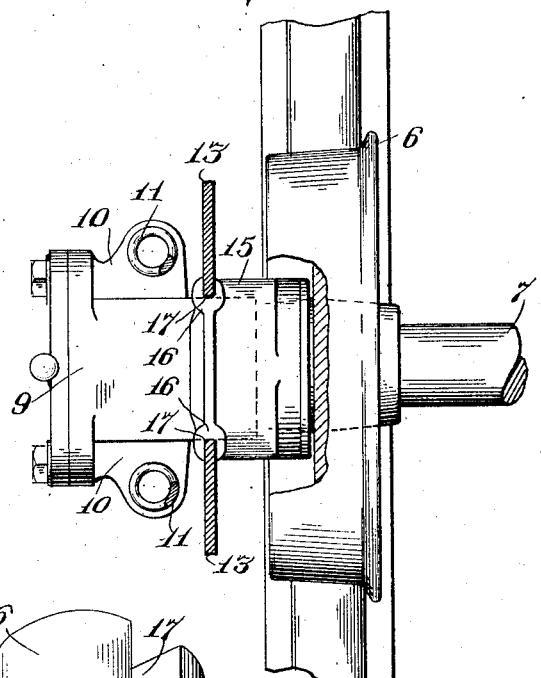
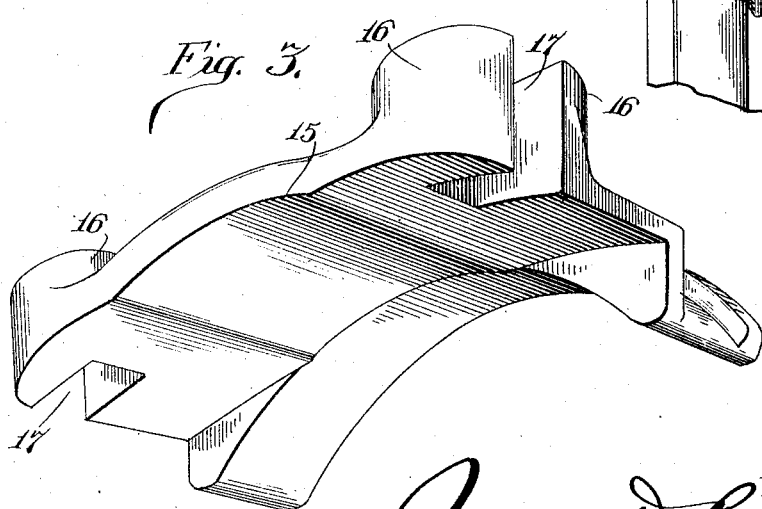

UNITED STATES PATENT OFFICE.

JAMES D. BENBOW, OF AURORA, ILLINOIS, ASSIGNOR TO WESTERN WHEELED SCRAPER COMPANY, OF AURORA, ILLINOIS, A CORPORATION OF ILLINOIS.

DUST-GUARD FOR CAR-AXLES.

1,389,289.   Specification of Letters Patent.   Patented Aug. 30, 1921.

Application filed October 29, 1920. Serial No. 420,389.

*To all whom it may concern:*

Be it known that I, JAMES D. BENBOW, a citizen of the United States, and a resident of Aurora, in the county of Kane and State of Illinois, have invented certain new and useful Improvements in Dust-Guards for Car-Axles, of which the following is a specification, reference being had to the accompanying drawings.

This invention relates to improvements in dust guards for car axles, and while particularly intended for use in connection with that class of car trucks employed with contractors' dump-cars are adapted for use with other types of car trucks. The leading object of the invention is to so construct a dust-guard that it can be readily applied in position and be held in place so as to effectually protect the journal portion of the axle without employing and screws, bolts or other usual securing devices. I accomplish this object by the construction and arrangement of parts shown in the drawing and hereinafter described.

In the drawings,—

Figure 1 is a view, partly in vertical section, of a portion of a truck frame and one of its wheels and the axle therefor with my improvements applied thereto;

Fig. 2 is a view partly in horizontal section,—the section being taken at line 2—2 of Fig. 1; and Fig. 3 is an enlarged perspective view of my improved dust guard.

Referring to the several figures of the drawing:—5 indicates one of the side bars of a truck frame here shown as formed of a channel bar. The truck frame as a whole may well be such as illustrated in Patent No. 1,361,808, dated December 14, 1920, granted upon my application. 6 indicates one of the wheels of the truck, its axle and the journal portion thereof being indicated by 7 and 8, respectively. 9 indicates the journal-box from the opposite sides of which project extensions 10 that furnish seats for the lower ends of two coiled springs 11 whose upper ends are supported in brackets 12 that bear against the lower flange of the side bar 5. 13—13 indicate two plates that are riveted to the outer face of the side bar 5 and extend down along opposite sides of the journal-box 9, the lower ends of such plates being connected as usual by a rod 14 that passes under and in contact with the lower face of the journal-box, the ends of such rod being turned to adapt them to pass through holes in the lower end portions of said plates. These vertically-disposed plates, connected together at their lower end portions as stated, constitute a pedestal for the journal-box,—their parallel inner edges forming vertical guides for such box during the relative vertical movement between the truck frame and axle which occurs as the springs 11 contract and expand, and is well understood. All of the parts so far briefly described are of well-known construction and arrangement. 15 indicates my improved guard which, as shown, is formed of a single piece, preferably a casting. At its outer end portion, viz., that part that extends over and rests upon the journal-box 9, its lower face is to be so shaped as to adapt it to conform to the upper face of the journal-box so as to rest firmly thereagainst. That portion that projects beyond the inner end of the journal-box and overlies the adjacent portion of the wheel-hub preferably has its lower face curved, as shown, so as to conform to the surface of the hub and thereby afford the fullest amount of protection to the axle journal that would otherwise be exposed to particles of foreign matter that would injure such journal. The outer end portion of the guard member 15 is very considerably thickened at each of its sides to form comparatively heavy heads 16, (see Fig. 3) and in each of such heads is formed a vertical slot 17. Into each of such slots projects a marginal portion of one of the pedestal plate members 13, as best shown in Fig. 2, the fit of the members 13 in such slots being such that the guard 15 can freely rise and fall relatively thereto with the journal-box upon which it rests. Providing the thickened portions or heads 16 not only provides increased strength but by reason of the greater bearing surfaces on the pedestal members 13 the guard is insured being held projected properly over the wheel hub which would be difficult to attain and yet have the device freely movable relative to the members 13 if the same width of slot were formed in material of the same, or substantially the same, thickness as the body of the guard.

By constructing and arranging the guard 15 in the manner described it will be seen that not only are all ordinary fastening devices such as screws, bolts and nuts dispensed with, but that the required securing of such guard in operative position with respect to the axle-journal is accomplished by utilizing the pedestal members 13 as guiding and securing means therefor without in any manner interfering with their primary function of guiding the journal-box as relative vertical movement between the pedestal and journal-box occurs.

What I claim as my invention and desire to secure by Letters Patent is,—

1. The combination with an axle and a wheel thereon, of a dust guard, means on the axle adjacent to the wheel upon which means the dust guard rests, and vertically-movable guiding means at the sides of the axle which guiding means have sliding engagement with said dust guard.

2. The combination with an axle and a wheel thereon, of a dust guard, means on the axle adjacent to the wheel upon which means the dust guard loosely rests, and a depending vertically-movable guiding member in sliding engagement with said dust guard.

3. The combination of a car-truck frame, an axle therefor, a wheel on said axle, an axle-box, spring means interposed between said frame and axle, rigid vertical members depending from said frame on opposite sides of said axle-box and a dust guard supported by said axle-box and having a relatively sliding engagement with said vertical members.

4. The combination of a car-truck frame, an axle therefor, a wheel on said axle, an axle-box, spring means interposed between said frame and axle, rigid vertical members depending from said frame on opposite sides of said axle-box, and a dust guard supported by said axle-box and having means at opposite edges for interlocking it with said vertical members and permitting a relative sliding movement between it and such members.

5. The combination of a car-truck frame, an axle therefor, a wheel on said axle, an axle-box, spring means interposed between said frame and axle, rigid vertical members depending from said frame on opposite sides of said axle-box, and a dust guard supported by said axle-box and having slots in opposite margins into which said vertical members respectively project.

6. The combination of a car-truck frame, an axle therefor, a wheel on said axle, an axle-box, spring means interposed between said frame and axle, rigid vertical members depending from said frame on opposite sides of said axle-box, and a dust guard supported by said axle-box, said guard having thickened portions at opposite sides in each of which is a vertical slot into which projects one of said vertical members.

JAMES D. BENBOW.